United States Patent [19]
Hauck et al.

[11] Patent Number: 5,834,764
[45] Date of Patent: Nov. 10, 1998

[54] NON-IMAGING COLLECTOR ELEMENT FOR INPUTTING SEED MONITORING SIGNALS TO DETECTOR OR OPTICAL FIBER

[75] Inventors: Douglas L. Hauck; Carolyn C. Mertins, both of Fargo, N. Dak.; Christopher J. Skarie, Audubon, Minn.; Jon T. Jacobson; Karl-Heinz O. Mertins, both of Fargo, N. Dak.

[73] Assignee: Deere & Company, Moline, Ill.

[21] Appl. No.: 858,392

[22] Filed: May 19, 1997

Related U.S. Application Data

[63] Continuation-in-part of Ser. No. 441,247, May 15, 1995, Pat. No. 5,650,609.

[51] Int. Cl.$^6$ ....................................................... H01J 3/14
[52] U.S. Cl. ...................... 250/216; 250/227.11; 359/726
[58] Field of Search .............................. 250/216, 227.11, 250/222.2; 359/726–731, 738; 221/254, 233

[56] References Cited

U.S. PATENT DOCUMENTS 4,068,121  1/1978  Bringhurst et al. .................. 250/227.28

OTHER PUBLICATIONS

Warren J. Smith, *Modern Optical Engineering*, 1966, pp. 234 and 235, McGraw–Hill, NY, U.S.A..

*Primary Examiner*—Que Le
*Attorney, Agent, or Firm*—Arnold International; Bruce Y. Arnold

[57] ABSTRACT

An improvement in a light collecting system for an agricultural seed monitor is disclosed. The light collecting system includes three optical surfaces: a convex lens surface, a planar surface, and a total internal reflection, cone condenser surface. The convex lens surface is designed to collect light from a seed sensing area of a seed tube and form a converging light beam. The converging beam is then incident onto the planar reflecting surface, which folds the optical axis of the converging light. The converging light beam is then incident onto a non-imaging, total internal reflection cone condenser surface. In a preferred embodiment all three optical surfaces are formed on a single prism made of plastic, with the convex lens being a spherical surface having a radius of curvature of about 20 mm, and the cone condenser surface having an input aperture diameter of about 6 mm and an output aperture diameter of about 0.9 mm.

9 Claims, 1 Drawing Sheet

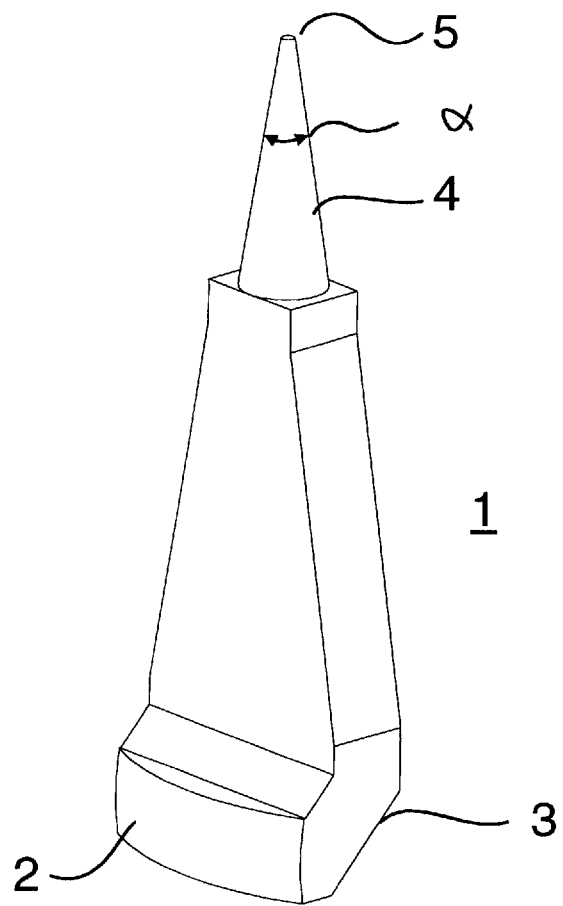
THE FIGURE

NON-IMAGING COLLECTOR ELEMENT FOR INPUTTING SEED MONITORING SIGNALS TO DETECTOR OR OPTICAL FIBER

CROSS REFERENCE TO RELATED APPLICATION

This application is a continuation-in-part of U.S. application Ser. No. 08/441,247, filed May 15, 1995, now U.S. Pat. No. 5,650,609 entitled "Seed Planter Monitoring System with Optical Sensors", the disclosure of which is hereby incorporated by reference.

BACKGROUND OF THE INVENTION

It has recently been proposed to use a spatially uniform, collimated beam for agricultural seed monitoring purposes and other applications where small particles need to be accurately counted as they pass a monitoring station at relatively high flow rates, see allowed U.S. application Ser. No. 08/441,247 entitled "Seed Planter Monitoring System with Optical Sensors". The present invention is an improvement on the collector optical system disclosed therein.

BRIEF SUMMARY OF THE INVENTION

A first object of the invention is provide a very compact and optically efficient means to collect spatially uniform, substantially collimated light traversing a seed tube and direct it into an optical fiber, or onto a detector, with minimal optical loss.

A second object of the invention is to provide an integral optical prism, made from injection molded plastic for attachment to a seed tube, the prism performing the function of a spherical collector lens, a planar folding mirror and non-imaging conical reflector.

BRIEF DESCRIPTION OF THE DRAWINGS

The FIGURE is a perspective view of the preferred embodiment of the optical system of the invention.

DETAILED DESCRIPTION

Referring to the FIGURE, there is illustrated a prism 1 which comprises the collector optical system of the invention. In the preferred embodiment, the prism is made of optical grade, acrylic PLEXIGLASS (i.e., acrylic polymethyl methacrylate) having an index of refraction of 1.49. Another preferred material that may be used in lieu of acrylic PLEXIGLASS is Type VM PLEXIGLASS. Of course other materials may be used, such as glass, which has an index of refraction in the range from 1.5 to 1.75. The minimum index of refraction for total internal reflection of a ray incident at 45 degrees to the surface normal is 1.414.

The collector system of the present invention includes at least three optical surfaces: a convex lens surface 2; a total internal reflection, planar surface 3; and a total internal reflection, cone condenser surface 4 which funnels the converging light to a small output aperture 5. After the seed tube sensing light is made to converge by the convex lens surface 2, it is incident onto the total internal reflection type planar surface 3, which folds the light path. In the preferred embodiment, the light is folded 90 degrees by having surface 3 oriented at a 45 degree angle to the optical axis of the convex spherical surface 2. However, the specific angular orientation may vary. The purpose for folding the light path is to allow the element that receives the light from the cone condenser to be mounted on and supported by the seed tube.

Convex optical surface 2, which in the preferred embodiment is spherical with a radius of curvature of 20 mm and a face that has a rectangular projection, converges the collimated light to a focus. As one of ordinary skill in the art would appreciate, it is not required that the convex optical surface 2 be spherical so long as the light is made to converge in at least one direction and fall within the input aperture of the conical reflector. Thus, an aspheric convex surface, such as a cylindrical surface could be used. Because the overall collection system is not an imaging optical system, the optical quality of the convex lens is relatively unimportant. In the preferred embodiment illustrated, the focal length of the spherical optical surface 2 is almost 61 mm, with the projected face of the spherical optical surface being rectangular in form and measuring about 6 mm by 18 mm.

The cone condenser 4, in a preferred embodiment, has an input cone diameter of about 6 mm (plus or minus 0.2 mm) and an output cone diameter of about 0.9 mm (plus or minus 0.2 mm). The length of the cone is about 17.5 mm (plus or minus 0.5 mm), with the cone angle, $\alpha$, lying in the range from 14 to 20 degrees. The function served by the cone condenser is to converge the light still further than done by the convex optical surface 2. Thus, the cone condenser 4 scrambles the normally formed image produced by the convex lens surface 2 and at the same time condenses the energy thereof to a smaller spot of light at the cone condenser output aperture than possible with merely the convex lens surface 2. As what is of interest is measuring the total amount of light flux collected by the spherical optical surface 1 (rather than forming an image), the cone condenser works well to further condense the light so that it can be input to either a detector or an end of an optical fiber. In normal use, a detector or fiber optic end surface abuts the planar output surface 5. An index matching gel may be used between the cone condenser tip (which itself is a planar surface) and the detector or fiber optic in order to prevent the output rays from being totally internally reflected and scattered.

The foregoing description is for illustration purposes only, it being intended that the scope of the invention be defined by the following claims and to include all additions and modifications thereto as would be obvious to one of ordinary skill in the art.

What is claimed is:

1. In a seed monitor system of an agricultural seed planter, the improvement of a light collecting system for collecting light traversing a seed sensing area of a seed tube, said light collecting system comprising at least three optical surfaces, as follows:

a convex lens surface;

a reflecting planar surface; and, a total internal reflection, cone condenser surface.

2. The apparatus of claim 1, wherein said reflecting planar surface is oriented with its surface normal at 45 degrees to an optical axis of the convex lens surface.

3. The apparatus of claim 1, wherein said at least three optical surfaces are integrally formed on a prism made of a transparent material.

4. The apparatus of claim 3, wherein the index of refraction of said prism is greater than 1.4.

5. The apparatus of claim 4, wherein the index of refraction of said prism is 1.49.

6. The apparatus of claim 1, wherein the convex lens surface is a spherical surface having a radius of curvature of about 20 mm.

7. The apparatus of claim 1, wherein the total internal reflection, cone condenser surface has an input aperture diameter of about 6 mm.

8. The apparatus of claim 1, wherein the total internal reflection, cone condenser surface has a cone angle in the range from 14 to 20 degrees.

9. The apparatus of claim 1, wherein the total internal reflection, cone condenser surface has an output aperture diameter of about 0.9 mm.

* * * * *